(12) United States Patent
Gade et al.

(10) Patent No.: US 6,754,571 B2
(45) Date of Patent: Jun. 22, 2004

(54) CONTROL OF MAGNETORHEOLOGICAL ENGINE MOUNT

(75) Inventors: Prasad V. Gade, Dayton, OH (US); Sanjiv G. Tewani, Lebenon, OH (US); Thomas A. Baudendistel, Farmersville, OH (US)

(73) Assignee: Delphi Technologies, Inc., Troy, MI (US)

( * ) Notice: Subject to any disclaimer, the term of this patent is extended or adjusted under 35 U.S.C. 154(b) by 73 days.

(21) Appl. No.: 09/918,416

(22) Filed: Jul. 30, 2001

(65) Prior Publication Data

US 2003/0025255 A1 Feb. 6, 2003

(51) Int. Cl.[7] .............................................. G06F 7/00
(52) U.S. Cl. ....................... 701/36; 188/267.2; 267/136
(58) Field of Search ............................... 188/267.2, 269, 188/327.21, 266.1, 276, 322.5; 267/140.14, 140.15, 35, 276, 136; 248/566, 550, 562; 701/36–38, 48; 252/62.52, 62.55

(56) References Cited

U.S. PATENT DOCUMENTS

| | | | |
|---|---|---|---|
| 3,807,678 A | 4/1974 | Karnopp et al. | |
| 4,491,207 A | 1/1985 | Boonchanta et al. | |
| 4,733,758 A | 3/1988 | Duclos et al. | |
| 4,953,089 A | 8/1990 | Wolfe | |
| 5,284,330 A | 2/1994 | Carlson et al. | |
| 5,549,837 A | * 8/1996 | Ginder et al. | 252/62.52 |
| 5,667,715 A | * 9/1997 | Foister | 252/62.52 |
| 5,678,460 A | * 10/1997 | Walkowc | 74/574 |
| 5,712,783 A | 1/1998 | Catanzarite | |
| 5,829,319 A | * 11/1998 | Mokeddem | 74/574 |
| 5,878,850 A | 3/1999 | Jensen | |
| 6,314,353 B1 | * 11/2001 | Ohsaku et al. | 701/37 |
| 6,315,277 B1 | * 11/2001 | Nagasawa | 267/140.14 |

* cited by examiner

Primary Examiner—Thomas G. Black
Assistant Examiner—Ronnie Mancho
(74) Attorney, Agent, or Firm—Scott A. McBain

(57) ABSTRACT

A system and method of controlling engine vibration mounted within a vehicle including at least one hydraulic mount, each mount including a fluid chamber. A pair of accelerometers sense relative acceleration across the mount between the engine and the frame and generate a relative acceleration signal. A control unit is electrically connected to the accelerometers. The control unit is adapted to generate an electronic control signal in response to the relative acceleration signal. The control device is responsive to the electric control signal for controlling the damping force of the hydraulic mount. A control algorithm calibrates the control unit such that maximum vibration damping occurs at and around the engine resonance bounce frequency.

22 Claims, 5 Drawing Sheets

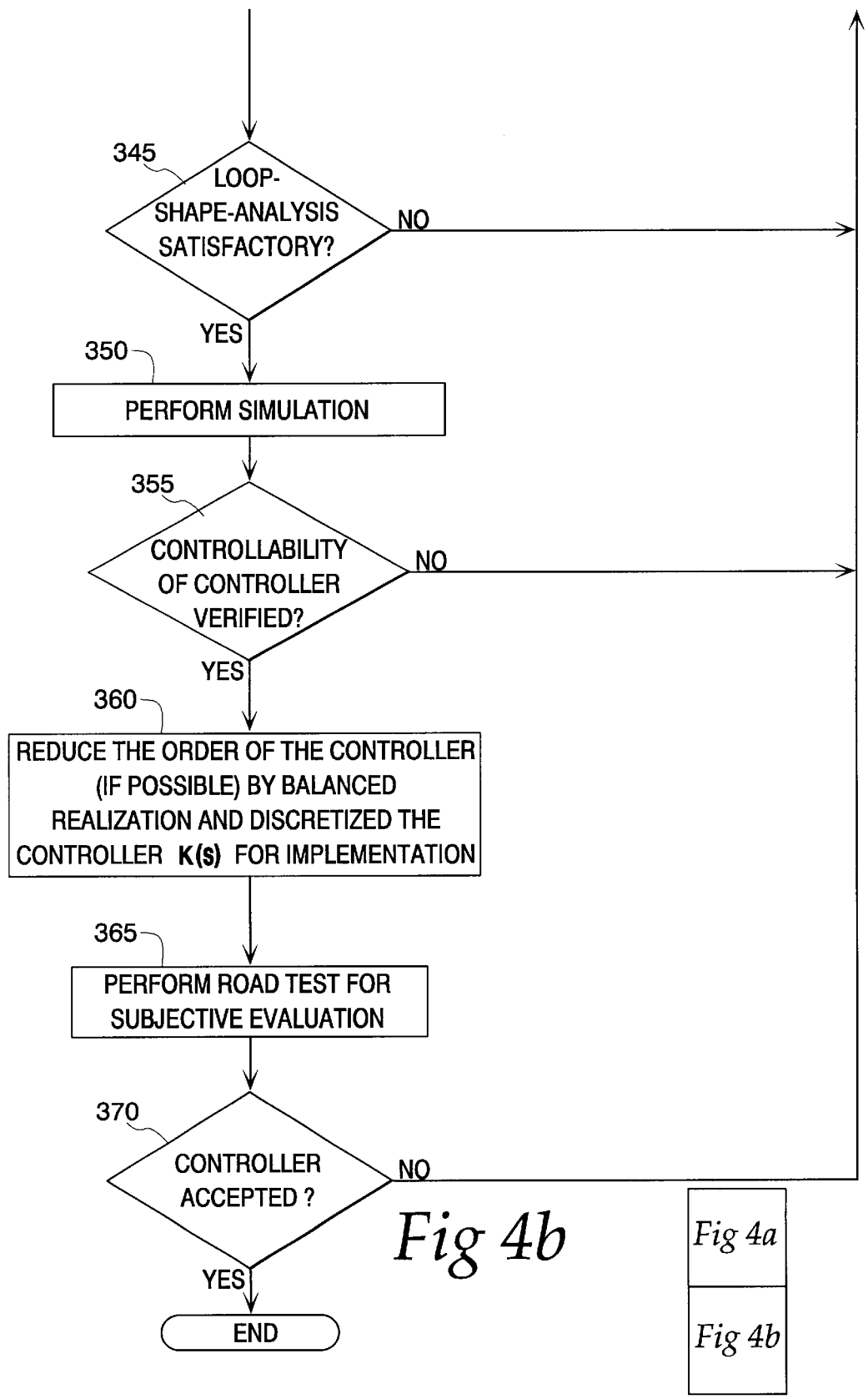

CONTROL OF MAGNETORHEOLOGICAL ENGINE MOUNT

TECHNICAL FIELD OF THE INVENTION

The present invention relates generally to a method of controlling a mounting arrangement for an automotive power unit such as a hydraulic mount for vibration damping of an engine or transmission. More particularly, the invention is directed to a system and controller for a hydraulic mount assembly that features accelerometers to sense the relative acceleration between a vehicle engine and body, the relative acceleration values of which may be used by a control unit to alter the control characteristics of the mount.

BACKGROUND OF THE INVENTION

Modern vehicle designs place an increasing demand for improved smooth running and driving comfort. To meet these requirements, there has been an increasing demand for further improved vibration damping or isolating characteristics of the engine mount. Minimizing the transmission of engine vibration at the bounce resonance frequency, i.e., the resonance frequency where the engine bounces most vigorously, to the frame is of particular interest, since it greatly impacts the smoothness of the ride comfort.

It is well known in the industry that the engine bounce frequency is a result of the body/engine properties. Thus for every change in the design of the body/engine (and hence the bounce resonance frequency), a new mount has to be designed.

A variety of engine mount assemblies are presently in use in the automotive industry to reduce the transmission of engine vibration to the car body. Examples of such vibration damping and/or isolation devices are vibration-absorbing, elastomeric automotive engine mounts. Hydraulic mounts combine the properties of elastomeric materials and viscous dampening properties of non-compressible hydraulic fluids and have been used in automobiles for decades. Hydraulic mounts are commonly elastomeric engine mounts enclosing a fluid-containing cavity. The cavity is separated into two chambers by a dividing plate where the plate contains an orifice to allow fluid to communicate between the two chambers. A pressure-receiving fluid chamber is formed between the orifice or partition plate and an elastic mount body, whereas an equilibrium chamber is formed between the plate and a diaphragm. These mounts are referred to as passive mounts (i.e., the dampening characteristics of which are a function of the design only).

Active mounts have more recently become known in the art. They provide electronic control of their dampening characteristics/behavior, and can typically exhibit responsive dampening behavior based on electronic input signals.

Active controllable dampening behavior of hydraulic mounts can be achieved by employing an electronically variable gate or valve to the orifice or track between the aforementioned fluid chambers. As the flow rate of fluid that is communicated between the chambers is altered, the dampening stiffness of the mount varies accordingly. The slow response time of mechanical valves or gates makes them less ideal for use in real-time tunable damping systems.

More recently, the use of controllable fluids such as electrorheological (ER) and magnetorheological (MR) fluids has been applied in engine mount designs. Examples of the use of MR hydraulic fluid dampers can be found in U.S. Pat. Nos. 5,284,330; 5,878,850 and 5,712,783. One example of an ER fluid mount can be found in U.S. Pat. No. 4,733,758. Magnetorheological fluids are materials that respond to an applied magnetic field with a dramatic change in the rheological behavior. The essential characteristic of these fluids is their ability to reversibly change from a free-flowing, linear, viscous liquid to a semisolid with controllable yield strength in milliseconds when exposed to a magnetic field. In MR engine mounts, the MR fluid is communicated via flow apertures in the separating plate between the two chambers where the fluid is exposed to a controllable magnetic field. As the MR fluid is exposed to the magnetic field, its sheer resistance increases and the dampening stiffness of the mount increases accordingly.

Active hydraulic MR mounts can be controlled by a current signal producing a proportional electromagnetic field in the track between the fluid chambers. The control signal is commonly produced by a controller unit utilizing one or more electrical control input signals. Typically, a sensor signal that is received by the controller will be proportional to a parameter such as vibratory motion (such as relative displacement, velocity or acceleration), but a sensor that measures mount fluid pressure, or other sensed dynamic properties can also be used. In complex control systems where the controller processes several such input signals to generate an output signal, the performance of the mount will depend greatly on the design and calibration of the system.

The use of MR and ER fluids in vibration damping mounts enables such mounts to produce real-time varying damping characteristics in response to supplied real-time control signals. It is well known in the art that successful damper performance for any vibration damping system is greatly dependent upon the particular control algorithm employed to vary the damper forces. Successful active damping of suspension systems and engine mounts in vehicles will typically require the controller to process several input signals from sensors such as relative displacement and/or its derivatives (velocity/acceleration), external force system disturbances and the like. One such control algorithm is presented in U.S. Pat. No. 4,953,089. Other examples of control algorithms for active vibration attenuation can be found in U.S. Pat. Nos. 3,807,678; 4,491,207; 5,712,783; 3,807,678 and 4,491,207 and references therein.

In designing such a control system, appropriate sensory input to the controller must be determined as well as the design of the control structure that is to be implemented in the controller device. An example of a controllable damper system and references to related patents can be found in U.S. Pat. No. 5,712,783.

It would be advantageous to provide a control system and method with the capability to control vibrations of various engine/frame assemblies without redesigning the system.

SUMMARY OF THE INVENTION

The present invention is directed to the need for redesigning engine mounts for changing body/engine characteristics. The current invention presents a system and method or algorithm for dynamically calibrating a mount type known as magnetorheological (MR) mounts where the dampening characteristics of the mount can be altered electronically without changing the design of the mount.

One aspect of the present invention includes a calibration control algorithm or method to determine the parameters of the controller. The real-time varying damping characteristics of the MR mount should exhibit optimal damping performance within a frequency window around the bounce frequency for a given body/engine design. It is therefore advantageous that the calibration algorithm allows the objective damping characteristics to be specified directly in the frequency domain. It is also desirable that the calibration algorithm has few tuning parameters and that it is robust with respect to convergence to an optimal calibration result.

Another aspect of the present invention may include the design of a control-loop structure that can be implemented in the controller such that the controller can produce a sufficient output control current signal to the magnetorheological control device of the mount. The output control signal is used to regulate the flow of MR fluid between the chambers so that maximum damping may be obtained in the net relative acceleration, at and around the bounce resonance frequency when subjected to external disturbances. External disturbances can be due to body acceleration transmitted by the road inputs through the wheels.

Another aspect of the present invention can include an algorithm for determining the parameters of the control-loop structure such that the controller produces sufficient output control current signal to the magnetorheological control device of the mount. The control device uses the control current signal to regulate the flow of MR fluid between the chambers so that maximum damping is obtained in the net relative acceleration, at and around the engine bounce resonance frequency when subjected to external disturbances due to body acceleration.

Another aspect of the invention provides a method of controlling a hydraulic mount of a vehicle engine including calibrating at least one tunable parameter of a control system of the mount based on an engine bounce resonant frequency, sensing a relative acceleration across the mount, generating a control signal responsive to the relative acceleration based on at least one tunable parameter and controlling the flow of MR fluid in the mount responsive to the control signal such that maximum vibration damping occurs at a predetermined band of frequencies.

The predetermined band of frequencies may occur at and around the resonance bounce frequency of the engine. Calibrating the tunable parameter may include tuning an objective function defined by a weighted sensitivity transfer function. The weighting function may be limited to the resonance bounce frequency. Calibrating the tunable parameter may include tuning an associated scalable factor. The associated scalable factor can be used to increase and decrease the magnitude of the weighting function.

Another aspect of the present invention provides a system for controlling a hydraulic vibration damping engine mount for a vehicle includes at least one mount, each mount defining a fluid chamber, means for sensing relative acceleration across each mount, a tunable control device operably connected to the sensing means for generating a control signal based on the sensed relative acceleration and maximized at a predetermined band of frequencies and a coil member positioned adjacent to the mount, the coil member operably connected to the control device for generating a magnetic field in the fluid chamber based on the control signal.

The sensing means can be a pair of accelerometers positioned such that a first accelerometer is placed on an engine of the vehicle and a second accelerometer is placed on a frame member of the vehicle. The at least one mount may include a first and a second mount. The first and second mounts may be placed between the engine and the frame in a spaced apart configuration. The mount may include a magnetorheological mount fluid. The coil may be positioned to control the flow of magnetorheological fluid between upper and lower chambers of each mount. The coil may include an annular coil positioned adjacent at least one passageway through a plate, the plate being positioned between the upper and lower chambers. The coil can be adapted to impart an increased shear resistance to the magnetorheological fluid when a current is passed through the coil.

Another aspect of the present invention provides a system for controlling a hydraulic mount of a vehicle engine including means for modifying at least one tunable parameter of a control system of the mount based on an engine bounce resonant frequency, means for sensing a relative acceleration across the mount, means for generating a control signal responsive to the relative acceleration based on the at least one tunable parameter and means for controlling the flow of MR fluid in the mount responsive to the control signal such that maximum vibration damping occurs at a predetermined band of frequencies.

Another aspect of the present invention provides a control system for a hydraulic mount for a vehicle including means for sensing a relative acceleration across the mount, means for generating a control signal corresponding to the relative acceleration, means for controlling the flow of MR mount fluid in the mount responsive to the control signal, means for tuning the control system such that maximum vibration damping occurs at and around the engine resonance bounce frequency.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
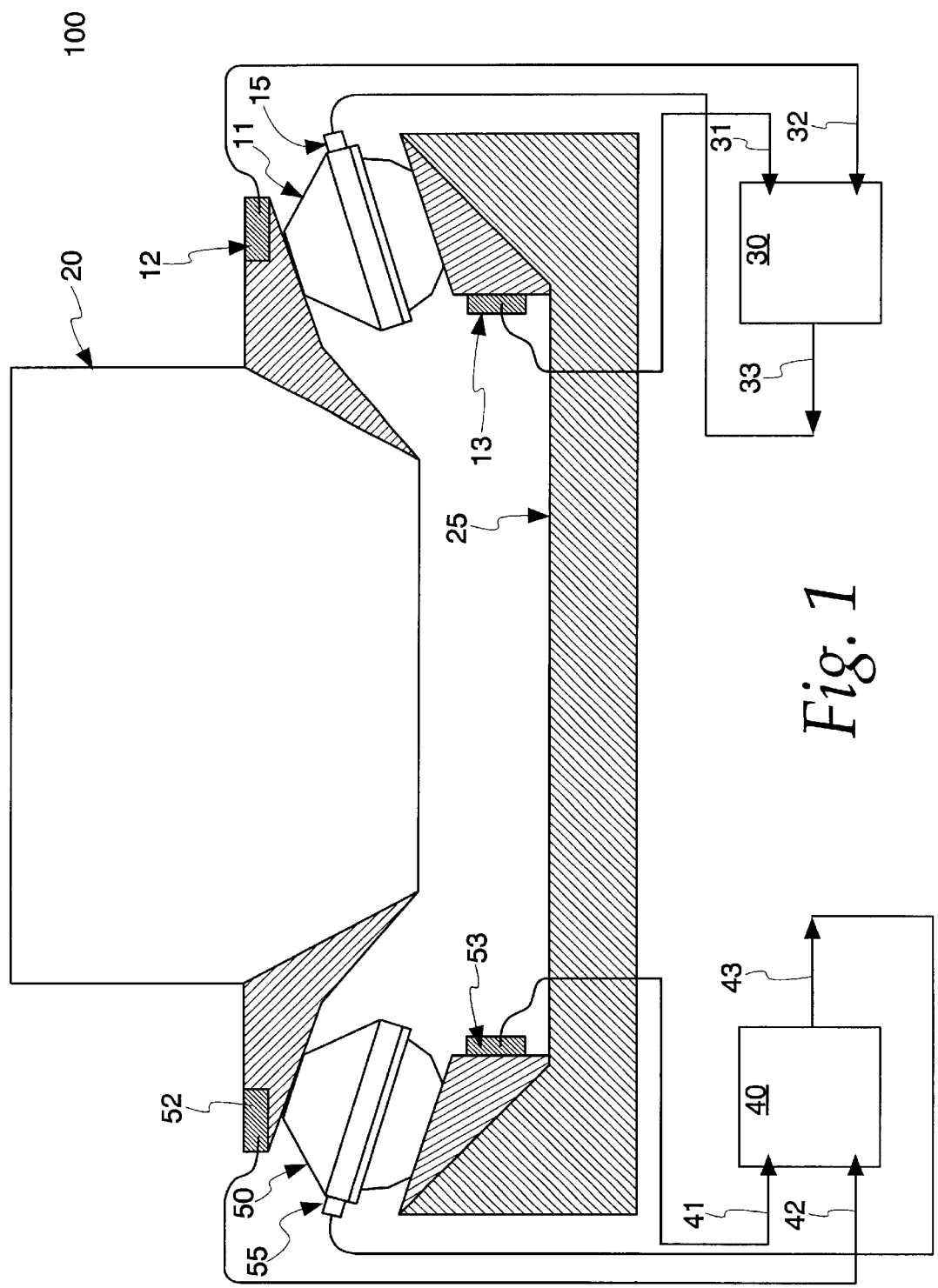
FIG. 1 is a schematic diagram conceptually depicting one embodiment of the present invention.

Referring to the drawings, illustrated in FIG. 1 is a generalized depiction of one embodiment of a mount and control system of the present invention indicated at 10. Mount assembly 11, 50 are attached to an engine 20 by a fastener, a stud, or the like, not shown in the present figure. Similarly, mount assemblies 11, 50 are attached to a vehicle body or frame member 25 such that the mount rests between engine 20 and frame member 25. The mount assemblies 11, 50 interact with the controllers 30, 40 to alter the flow characteristics of the MR fluid, thereby changing the vibration damping characteristics. The controllers 30, 40 can be any electrically controlled device, combined into one unit or separate, such as a microprocessor or a digital signal processor, providing the capability of altering the ability of the mount to change the damping characteristics. The controllers 30, 40 are connected to the engine mounts 11, 50 via any one or more electrical field generating devices, such as a coil or the like.

The mount assemblies 11, 50 include engine accelerometers 12, 52 and body accelerometers 13, 53 positioned to sense the relative acceleration between engine 20 and body 25. The accelerometers 12, 13, 52, 53 can generate the input or relative acceleration signals 31, 32, 41, 42 communicated to controllers 30, 40. In response to the input signals 31, 32, 41, 42 from the accelerometers 12, 13, 52, 53 the control device using electricity from power source, not shown, can generate control current signals 33, 43. Control current signals 33, 43 can traverse through a coil 15, 55, or the like, generating an electromagnetic field thereby changing the properties of the MR fluid.

Figure 2:
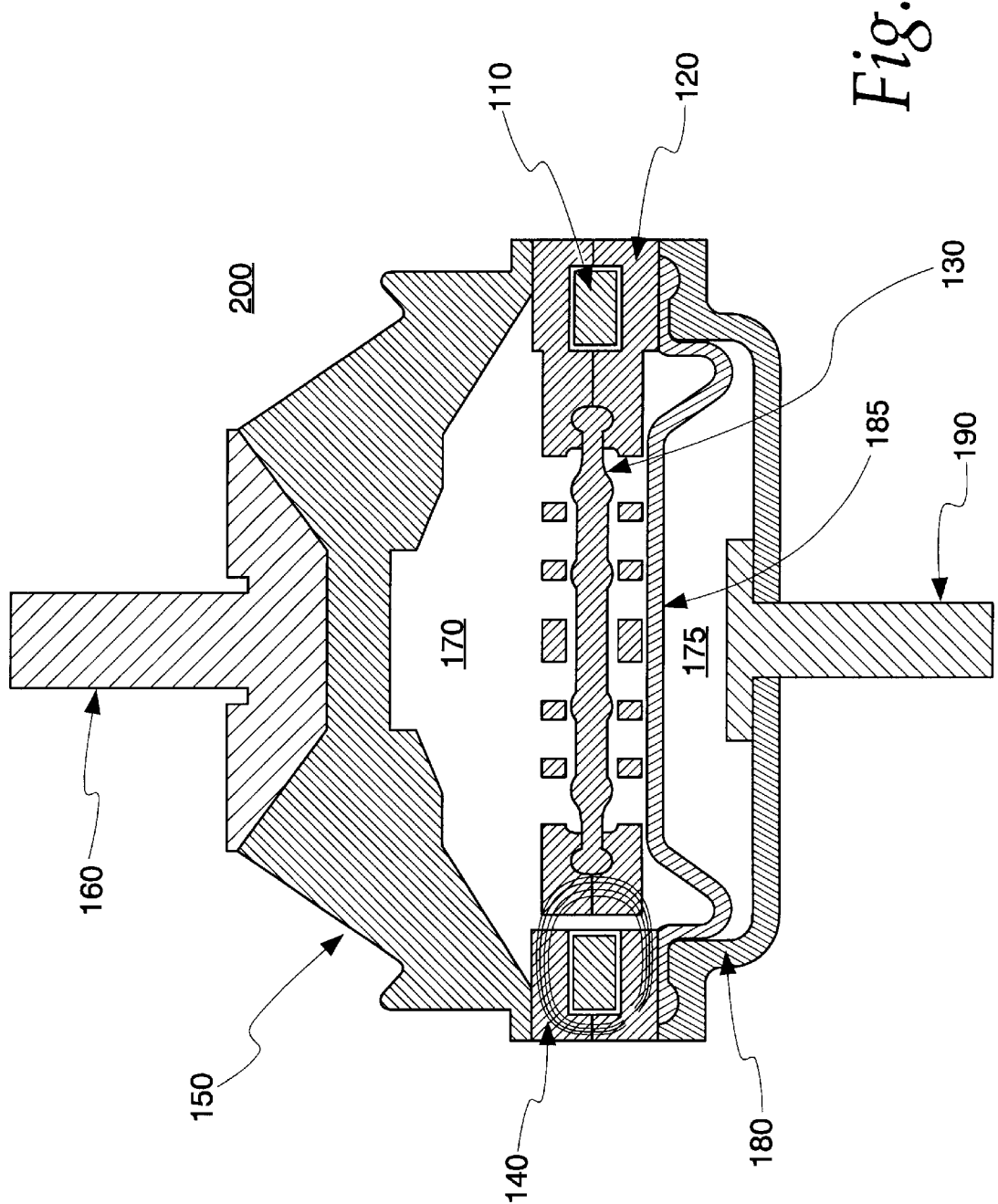
FIG. 2 illustrates a cross-sectional view of one embodiment of the present invention.

FIG. 2 illustrates an embodiment of a MR mount 100 of the present invention. The mount assembly 100 can include a disc shaped orifice plate 130 and a coil 110 wrapped in or adjacent a metal mounting ring, member or housing 120. The mounting member 120 may be positioned between a base plate 180 and a hollow flexible body 150. The base plate 180 and body 150 can each include a respective mounting stud 160, 190.

The mount also can comprise a first chamber 170 defined in part by the body 150. Elastomeric materials, including natural or synthetic rubber, silicon elastomer, and thermoplastic elastomer, can be used to form the body 150. An elastomeric diaphragm 185 can be bonded to a surface of the housing 180 to define a second chamber 175. The coil 110 is positioned to generate an electrical field across gap 195 formed between the orifice plate 130 and coil 110 or member 120. The orifice plate 130 can be positioned to divert the flow of fluid in the mount assembly 100 adjacent the coil 110 to influence the shear resistance characteristics of the fluid.

In one embodiment of the present invention, accelerometers 12, 13, 52, 53 are positioned on the body 25 and the engine 20 to measure a relative acceleration for use in providing an output feedback to a control system. Other suitable devices or arrangements may be used to measure relative acceleration. A plant model may be derived to define the physical system being controlled. The derivation of plant model is governed by the dynamic equations representing the behavior of the MR fluid within the two chambers and track of the hydraulic mount. In particular, the input (current)-output (relative acceleration) relationship describing the plant model can be derived from the differential equations describing the relations between the flow rates of the fluid and pressures within the two chambers and the track connecting them.

The aim of the controller 30, 40 includes producing sufficient current in the track of the MR mount when subjected to external disturbances such that maximum damping is obtained in the net acceleration, at and around the engine bounce resonance frequency. The desired current produced by the controller may be cascaded to the plant, and or is an output feedback to the control system.

An aspect of the present invention includes defining a cost function. A cost function is a quantitative description of the desired objectives expressed mathematically, in this case, in the frequency domain. In control literature sensitivity transfer function is commonly used as an objective function that is indicative of performance of the system. Sensitivity function defines the relationship between exogenous disturbances acting at the output of the plant to the plant output that is to be controlled. The aim is to make the closed loop system "less" sensitive to such disturbances and yet yield consistently good performance results. Small sensitiveness can be achieved by minimizing the maximum (infinity) norm of sensitivity function (cost function) over a predefined range of frequencies. The lower the maximum norm of the transfer function, the less sensitive the closed loop system will be to external disturbances. Such a behavior of insensitiveness to external disturbance is necessary for consistent performance results.

Mathematically, the objective can be written as $$\text{Minimize such that } \|[\eta W_1(I+G_uK)^{-1}]\|_\infty < \gamma \quad (1)$$

In the expression, $W_1(s)$ is the weighting function that serves as a tuning knob to achieve the desired result of minimizing the function below a pre-specified upper bound $\gamma$. I is the identity matrix and $\eta$ is the scaling factor on the weighting function $W_1(s)$. $G_u(s)$ is the plant transfer function that relates current required in the track of the mount to the component of the relative acceleration it produces. The frequency range, in the performance specification where maximum damping is needed, can be described by $W_1(s)$, which could be a bandpass filter or other, shaping characteristic where maximum performance is desired. The controller $K(s)$ will then attempt to minimize the infinity norm of the bandpass performance measure to achieve maximum damping in the desired region.

The order of the controller increases as the order of the weighting functions increases. Similarly, by increasing the objective functions to be minimized, the order of the controller increases proportionally. The higher the order of the controller, the more complex implementation becomes. Multiple objective functions have indicated little improvement over what could be achieved with sensitivity minimization alone. For these reasons, the controller should be kept at a minimum.

Figure 3:
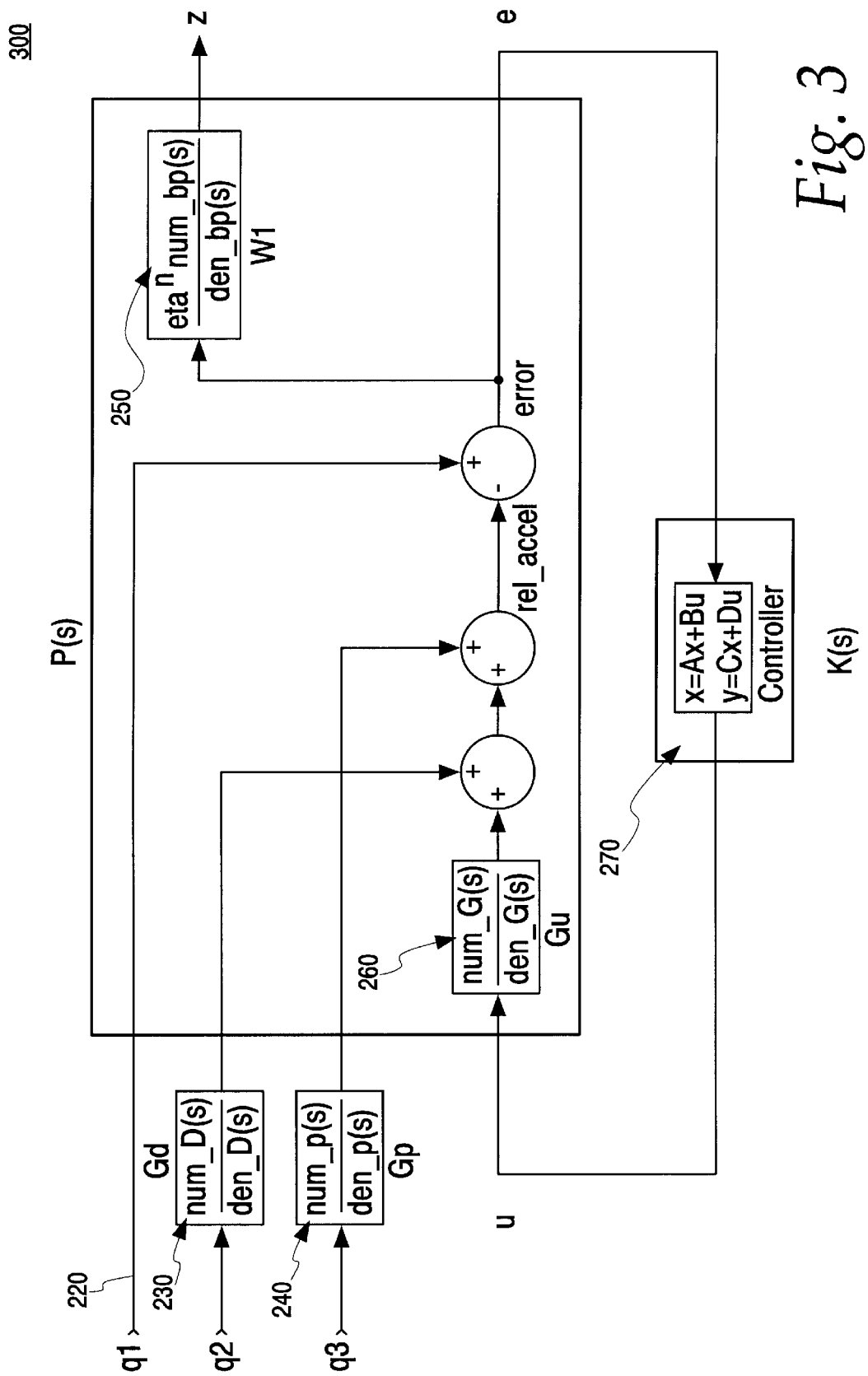
FIG. 3 illustrates a control loop structure of one embodiment of the present invention.

Referring to the drawings, FIG. 3 illustrates an embodiment of a control loop structure consisting of a generalized plant and a controller model 200. The control loop structure is known in the art as a 2-port representation of a plant. The loop structure is selected for compatibility with the requirements of a particular design. In general, since the performance specifications are frequency based, namely the band of frequencies around the resonance frequency for engine bounce, the objectives can be specified in the frequency domain directly, avoiding the need to convert to time domain specifications.

The generalized plant P(s) 210 defined by the original plant $G_u(s)$ 260, the preload $G_p(s)$ 240, the body acceleration $G_d(s)$ 230, the weighting function $W_1(s)$ 210 and the reference signal for acceleration 220, is formed to generate a relative acceleration signal to the controller. K(s) 270 is the generalized controller to be designed.

The system of FIG. 3 can be described by $$\begin{bmatrix} z \\ y \end{bmatrix} = P(s) \begin{bmatrix} q \\ u \end{bmatrix} = \begin{bmatrix} P_{11}(s) & P_{12}(s) \\ P_{21}(s) & P_{22}(s) \end{bmatrix} \quad (2)$$

where P(s) is partitioned such that $$z = P_{11}q + P_{12}u$$

$$y = P_{21}q + P_{22}u \quad (3)$$

The input signal vector 'q' consists of all exogenous inputs comprising plant disturbances, sensor noises, and model-error outputs. The controller output is represented by 'u', and 'y' is a vector of signals consisting of measurements, references and other signals that are available for online control purposes. Signal $z=(z_1, z_2)$ is a vector comprised of weighted cost functions. Eliminating 'u' and 'y' using u=Ky, the closed-loop transfer matrix from 'q' to 'z' can be given by the linear fractional transformation ($F_e$)

$$z = F_e(P,K)q \quad (4)$$

where $$F_e(P,K) = P_{11} + P_{12}K(I - P_{22}K)^{-1}P_{21} \quad (5)$$

The minimization of the $H_\infty$ norm of $z = F_e(P,K)q$ over all realizable controllers K(s) constitutes the $H_\infty$ control problem. The $H_\infty$ norm of a transfer function is defined as the largest input/output root-mean-square gain.

The overall control objective is now to minimize the $H_\infty$ norm of the transfer function from 'q' to 'z'. Specifically, the control problem is to find a controller K, which is based on the sensor data 'y', generates a counteracting control signal u that minimizes the unwanted influence of exogenous signals 'q' on the cost functions of interest 'z'. The elements of the generalized plant P(s) are obtained by manipulating the weighted cost functions of the vector 'z' into lower linear fractional transformation form. The state-space representation for the resulting generalized plant is given by $$P = \begin{bmatrix} A_p & B_{1p} & B_{2p} \\ C_{1p} & D_{11p} & D_{12p} \\ C_{2p} & D_{12p} & D_{22p} \end{bmatrix} \quad (6)$$

which yields the following state-space equations $$\dot{x} = A_p x + B_{1p} q + B_{2p} u$$

$$z = C_{1p} x + D_{11p} pq + D_{12p} u$$

$$y = C_{2p} x + D_{21p} q + D_{22p} u \quad (7)$$

Figure 4A:
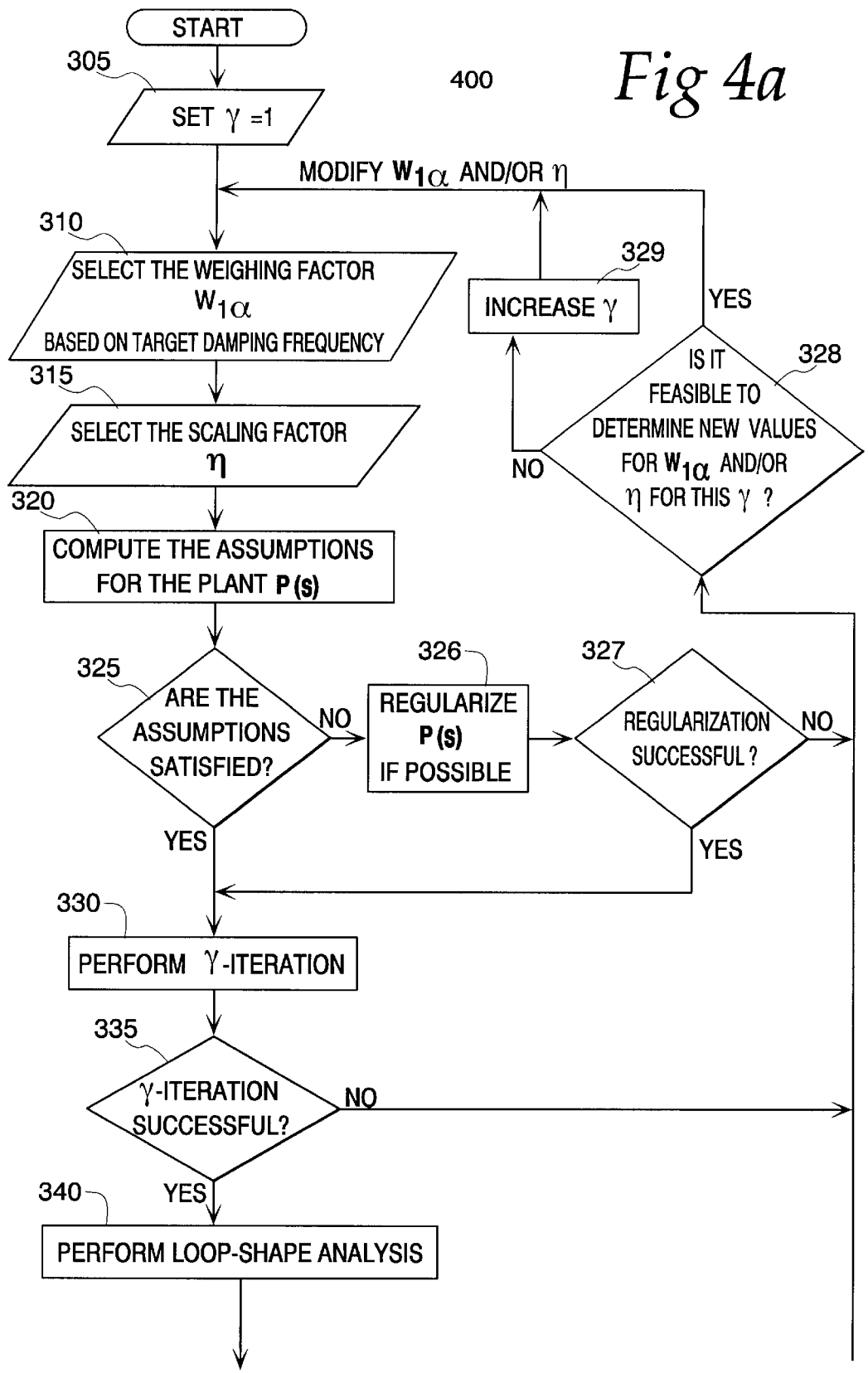
FIGS. 4A/B illustrates a flow diagram of one embodiment of a method of controlling a MR mount according to the present invention.

In FIGS. 4A/B, a flow diagram of a control algorithm 300 provides further detail of an embodiment of designing the left and right controllers 30, 40. A first tunable parameter γ can be selected (Block 305). The tunable parameter γ is the upper bound of the objective function obtained by taking the weighted sensitivity transfer of the closed loop system. The value of γ is typically fixed at 1, but when changed, it is usually increased, indicating that a decreased performance of the controller is acceptable.

A second tunable parameter can be selected $W_1(s)$, which may function like a bandpass filter (Block 310). The tunable parameter $W_1$ acts as the weighting function of the sensitivity transfer function. The only input used in specifying the weighting function $W_1$ is the band of frequencies used as part of the objective function. This band of frequencies may differ from vehicle to vehicle depending on the engine bounce resonance frequency.

After the weighting function $W_1$ is selected, a third tunable parameter η can be selected (Block 315), which is an associated scaling factor. This scalable factor η can be used to increase or decrease the magnitude of $W_1$, and thus the desired engine bounce attenuation in the entire frequency gamut.

In order to meet existence and feasibility requirements, the design of the controller is subjected to certain assumptions and conditions. A computation may be performed to ensure that assumptions are satisfied by the generalized plant to achieve the controller (Block 320). The assumptions to be satisfied include whether the generalized plant (a) is stabilizable and detectable, necessary for the existence of the controller, (b) satisfies certain rank conditions to ensure realizability of the controller, (c) has no eigenvalues or zeros existing of the imaginary axis of the Laplace complex plane and (d) is strictly proper.

In other words, it is assumed that ($A_p$, $B_{2p}$) is stabilizable and ($C_{2p}$, $A_p$) is detectable which are necessary conditions for the existence of stabilizing controllers. To ensure realizability of the controller it is assumed that the rank conditions, $$\text{rank}(D_{12p}) = m_2 \; \text{rank}(D_{21p}) = p_2$$

are satisfied. In addition, the rank conditions:

$$\text{Rank}\begin{bmatrix} A_p - j\omega I & B_{2p} \\ C_{1p} & D_{12p} \end{bmatrix} = n + m_2 \forall \omega$$

$$\text{Rank}\begin{bmatrix} A_p - j\omega I & B_{1p} \\ C_{2p} & D_{21p} \end{bmatrix} = n + p_2 \forall \omega$$

together with stabilizability and detectability conditions guarantees that the two Hamiltonian matrices have no eigenvalues on the imaginary axis. The above condition is also equivalent to $P_{12}(s)$ and $P_{21}(s)$ having no zeros on the jω-axis. For simplicity it can be assumed that $D_{11p}=0$ and $D_{22p}=0$ to make $P_{11}$ and $P_{22}$ strictly proper where $x(t) \in \Re^n$, $q(t) \in \Re^{m_1}$, $z(t) \in \Re^{p_1}$, $u(t) \in \Re^{m_2}$ and $y(t) \in \Re$ Verification is performed to determine whether the above assumptions are satisfied (Block 325). When assumptions (b) and (c) are not satisfied by the generalized plant, then the plant is said to be un-regularized and requires regularization (Block 326). Regularization is achieved by small perturbation of the generalized plant. A test may be performed to determine whether successful regularization has taken place (Block 327). The regularization process may fail when the model has been mis-characterized, in which case a new controller must be derived.

The algorithm can derive a new controller (Block 328). The new controller can be derived by modifying the three tuning parameters γ305, $W_1$310 and η315. To obtain a new controller, $W_1$ and/or η are typically modified while γ remains constant, and is typically set to 1. In one embodiment, when the combination of $W_1$ and η are exhausted, γ will be modified, at which point the value is usually increased.

A determination may be performed (Block 328) to verify whether or not a new controller can be derived by only modifying $W_1$ and/or η, and not γ. If only $W_1$ and/or η requires modification, the algorithm loops back to Block 310. If γ requires modification (Block 329), it may be increased before modifying the weighting function $W_1$ (Block 310).

If the assumptions are satisfied (Block 325), the algorithm then proceeds to check whether the conditions, a) that a solution exists for the two algebraic Riccati equations given below $$X_\infty = X_\infty^T = Ric\begin{bmatrix} A_p & \gamma^{-2}B_{1p}B_{1p}^T - B_{2p}B_{2p}^T \\ -C_{1p}^T C_{1p} & -A_p^T \end{bmatrix} \geq 0$$

$$Y_\infty = Y_\infty^T = Ric\begin{bmatrix} A_p^T & \gamma^{-2}C_{1p}^T C_{1p} - C_{2p}^T C_{2p} \\ -B_{1p}B_{1p}^T & -A_p \end{bmatrix} \geq 0$$

b) that the above two Hamiltonians (matrices with above structure) have no imaginary eigenvalues, and c) that the spectral radius $\rho(X_\infty Y_\infty)<\gamma^2$ are satisfied (Block 330). Satisfying these necessary and sufficient conditions ensures the existence of a stabilizing controller for the generalized plant. If they are not satisfied, the algorithm determines the feasibility of calculating the controller by selecting a new weighting function and new values for the scaling factors (Block 328). If not feasible, the algorithm increases γ (Block 329). If feasible without increasing γ, the algorithm returns to modifying a weighting function (Block 310) and so on. If the conditions are also satisfied, then the algorithm proceeds to calculate the controller K(s) defined by equation:

$$K(s) = \begin{bmatrix} A_\infty & -Z_\infty L_\infty & Z_\infty B_{2p} \\ F_\infty & 0 & I \\ -C_{2p} & I & 0 \end{bmatrix} \quad (8)$$

where $A_\infty = A_p + \gamma^{-2} B_{1p} B_{1p}^T X_\infty + B_{2p} F_\infty + Z_\infty L_\infty C_{2p}$ $Z_\infty = (I - \gamma^{-2} Y_\infty X_\infty)^{-1}$ $F_\infty = -B_{2p}^T X_\infty$ $L_\infty = -Y_\infty C_{2p}^T$ Once the controller K(s) is designed using the above closed-form solution, the loop-shape analysis of the derived controller is performed (Block 340).

A test may be performed to determine whether the characteristics of the loop-shape analysis (Block 340) were considered successful (Block 345). If the loop-shape is considered unsuccessful, a new controller must be found (Block 328). If the loop-shape characteristics are satisfactory, a simulation using real input disturbance data may be run (Block 350). Engine bounce controllability is determined by analyzing time-domain and power spectral density (PSD) plots. If the plots cannot verify controllability of the engine bounce, then a new controller must be found (Block 328).

If controllability of the engine bounce by the derived controller may be verified, then the order of the controller is reduced by balanced realization, if possible, and discretized for implementation in a rapid prototyping software/hardware, like Autobox (Block 360).

Next, a subjective road test may be performed (Block 365). Ride engineers drive the vehicle to collect and evaluate data for the controller. Data from seat accelerometers may also be collected for analysis of magnitude attenuation.

A test may be performed to determine or test whether the controller is accepted or rejected (Block 370). A subjective determination may be made on the control of the engine bounce by the controller. If both results from the subjective evaluation and the data collected from the seat accelerometers confirm enough control of the engine bounce, without any negative impact on harshness or control authority, then the controller may be selected as the final controller. If however, the results do not indicate enough control of engine bounce, then the algorithm branches attempts to find a new and better controller by modifying the tuning parameters (Block 328).

In this manner, the present invention provides a system and method for adapting a control system to control engine vibrations in vehicles with different vibration characteristics without the need to redesign physical or control aspects of the system.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of controlling a hydraulic mount of a engine comprising:

calibrating at least one tunable parameter of a control system of the mount based on an engine bounce resonant frequency;

generating a first acceleration signal;

generating a second acceleration signal;

determining a relative acceleration across the mount based on the first and second acceleration signals;

generating a control signal responsive to the determined relative acceleration based on the at least one tunable parameter; and controlling the flow of MR mount fluid in the mount responsive to the control signal such that maximum vibration damping occurs at a predetermined band of frequencies.

2. The method of claim 1 wherein the predetermined band of frequencies occurs at and around the resonance bounce frequency of the engine.

3. The method of claim 2 wherein calibrating at least one tunable parameter comprises tuning an objective function obtained by a sensitivity function.

4. The method of claim 3 wherein calibrating at least one tunable parameter comprises tuning a weighting function.

5. The method of claim 4 wherein the weighting function is limited to the resonance bounce frequency.

6. The method of claim 5 wherein calibrating at least one tunable parameter comprises tuning an associated scalable factor.

7. The method of claim 6 wherein the associated scalable factor is used to increase and decrease the magnitude of the weighting function.

8. A system for controlling a hydraulic vibration damping engine mount for a vehicle comprising:

at least one mount, each mount defining a fluid chamber;

means for sensing relative acceleration across each mount;

a tunable control device operably connected to the sensing means for generating a control signal based on the sensed relative acceleration and maximized at a predetermined band of frequencies; and a coil member positioned adjacent to the mount, the coil member operably connected to the control device for generating a magnetic field in the fluid chamber based on the control signal;

wherein the sensing means is a pair of accelerometers positioned such that a first accelerometer is placed on an engine of the vehicle and a second accelerometer is placed on a frame member of the vehicle.

9. The system of claim 8 wherein the at least one mount includes a first and a second mount.

10. The system of claim 9 wherein the first and second mounts are placed between the engine and the frame in a spaced apart configuration.

11. The system of claim 8 wherein the mount includes a magnetorheological mount fluid.

12. The system of claim 11 wherein the coil is positioned to control the flow of magnetorheological fluid between upper and lower chambers of each mount.

13. The system of claim 12 wherein the coil includes an annular coil positioned adjacent at least one passageway through a plate, the plate being positioned between the upper and lower chambers.

14. The system of claim 13 wherein the coil is adapted to impart an increased shear resistance to the magnetorheological fluid when a current is passed through the coil.

15. A system for controlling a hydraulic mount of a engine comprising:

means for modifying at least one tunable parameter of a control system of the mount based on an engine bounce resonant frequency;

means for generating a first acceleration signal;

means for generating a second acceleration signal;

means for calculating a relative acceleration across the mount based on the first and second acceleration signals;

means for generating a control signal responsive to the relative acceleration based on the at least one tunable parameter; and means for controlling the flow of MR fluid in the mount responsive to the control signal such that maximum vibration damping occurs at a predetermined band of frequencies.

16. The system of claim 15 wherein the predetermined band of frequencies occurs at and around the resonance bounce frequency of the engine.

17. The system of claim 16 wherein the means for tuning at least one tunable parameter comprises an objective function obtained by a sensitivity function.

18. The system of claim 17 wherein the means for tuning at least one tunable parameter comprises a weighting function.

19. The system of claim 18 wherein the weighting function is based on the resonance bounce frequency.

20. The system of claim 19 wherein the means for tuning at least one tunable parameter comprises an associated scalable factor.

21. The system of claim 20 wherein the associated scalable factor is used to increase and decrease the magnitude of the weighting function.

22. A control system for a hydraulic mount for a comprising:

means for generating a first acceleration signal;

means for generating a second acceleration signal;

means for determining a relative acceleration across the mount based on the first and second acceleration signals;

means for generating a control signal corresponding to the relative acceleration;

means for controlling the flow of MR fluid in the mount responsive to the control signal;

means for tuning the control system such that maximum vibration damping occurs at and around the engine resonance bounce frequency.

\* \* \* \* \*